US010818031B2

(12) United States Patent
McNeally et al.

(10) Patent No.: US 10,818,031 B2
(45) Date of Patent: Oct. 27, 2020

(54) SYSTEMS AND METHODS OF DETERMINING A LOCATION OF A MOBILE CONTAINER

(71) Applicant: Blynk Technology, Portland, ME (US)

(72) Inventors: Allegra A. McNeally, Scarborough, ME (US); M. Alamgir Tamoori, Lahore (PK); Daniel Shahzad Kirmani, Scarborough, ME (US); Gabriel Shahzad Kirmani, Scarborough, ME (US)

(*) Notice: Subject to any disclaimer, the term of this patent is extended or adjusted under 35 U.S.C. 154(b) by 67 days.

(21) Appl. No.: 16/198,262

(22) Filed: Nov. 21, 2018

(65) Prior Publication Data
US 2019/0156513 A1 May 23, 2019

Related U.S. Application Data

(60) Provisional application No. 62/590,133, filed on Nov. 22, 2017.

(51) Int. Cl.
H04N 5/247 (2006.01)
G06T 7/73 (2017.01)
(Continued)

(52) U.S. Cl.
CPC ............... G06T 7/74 (2017.01); G01C 21/16 (2013.01); G01S 5/14 (2013.01); G06K 9/6202 (2013.01);
(Continued)

(58) Field of Classification Search
CPC . G06T 7/74; G06T 7/521; G06T 2207/10028; G06T 2207/10048;
(Continued)

(56) References Cited

U.S. PATENT DOCUMENTS 5,051,906 A * 9/1991 Evans, Jr. ................ G01S 5/16
180/169
6,915,135 B1 7/2005 Mckee et al.
(Continued)

FOREIGN PATENT DOCUMENTS

CN 106971330 A 7/2017
WO 2009035632 A1 3/2009
WO 2014063157 A2 6/2014

OTHER PUBLICATIONS

Zimmerman, "Tracking shopping carts using mobile cameras viewing ceiling-mounted retro-reflective bar codes", Computer Vision Systems, 2006 ICVS'06, IEEE International Conference, IEEE, 2006, 3 pgs.
(Continued)

Primary Examiner — William C Vaughn, Jr.
Assistant Examiner — Jae N Noh
(74) Attorney, Agent, or Firm — Michael A. Rodriguez

(57) ABSTRACT

A system for locating a mobile container within a facility comprises an optical sensor system with an optical sensor fixed to a frame of the container. The optical sensor is pointed away from the container in a direction facing a region of the facility (e.g., ceiling or floor) where one or more distinctive physical features are expected to be found. Each distinctive physical feature of the facility is associated with a location in the facility. The optical sensor is adapted to capture an image of that region of the facility. A computing system includes a processor configured to receive the image from the optical sensor, to determine that a physical feature found in the image matches one of the distinctive physical features of the facility, and to identify the container as being at the location in the facility associated with the matching distinctive physical feature.

14 Claims, 4 Drawing Sheets

(51) Int. Cl.
  *G06K 9/62*   (2006.01)
  *G01S 5/14*   (2006.01)
  *G01C 21/16*  (2006.01)
  *G06T 7/521*  (2017.01)

(52) U.S. Cl.
  CPC ............. *G06T 7/521* (2017.01); *H04N 5/247* (2013.01); *G06T 2207/10028* (2013.01); *G06T 2207/10048* (2013.01)

(58) Field of Classification Search
  CPC ........ G01C 21/16; G01S 5/14; G06K 9/6202; H04N 5/247
  USPC ........................................................ 348/136
  See application file for complete search history.

(56) References Cited

U.S. PATENT DOCUMENTS

| | | | |
|---|---|---|---|
| 7,337,960 | B2 | 3/2008 | Ostrowski et al. |
| 7,681,796 | B2 | 3/2010 | Cato et al. |
| 7,739,157 | B2 | 6/2010 | Bonner et al. |
| 7,996,281 | B2 | 8/2011 | Alvarez et al. |
| 8,210,435 | B2 | 7/2012 | Mahan et al. |
| 8,325,982 | B1 | 12/2012 | Moon et al. |
| 8,381,982 | B2 * | 2/2013 | Kunzig ................ G05D 1/0291 235/462.08 |
| 8,463,540 | B2 | 6/2013 | Hannah et al. |
| 8,565,913 | B2 * | 10/2013 | Emanuel ............... B66F 9/0755 340/572.1 |
| 8,651,389 | B2 | 2/2014 | Shastri et al. |
| 9,033,238 | B2 | 5/2015 | Davis |
| 9,064,161 | B1 | 6/2015 | Boman et al. |
| 9,076,149 | B2 | 7/2015 | Sorensen et al. |
| 9,129,277 | B2 | 9/2015 | Macintosh |
| 9,269,026 | B2 | 2/2016 | Miyakoshi |
| 9,269,093 | B2 | 2/2016 | Lee et al. |
| 9,288,450 | B2 | 3/2016 | Rai et al. |
| 9,702,707 | B2 | 7/2017 | Goldman et al. |
| 2002/0161651 | A1 | 10/2002 | Godsey et al. |
| 2006/0010027 | A1 | 1/2006 | Redman |
| 2006/0163349 | A1 | 7/2006 | Neugebauer |
| 2009/0134221 | A1 | 5/2009 | Zhu et al. |
| 2009/0319388 | A1 | 12/2009 | Yuan et al. |
| 2012/0019393 | A1 | 1/2012 | Wolinsky et al. |
| 2012/0158297 | A1 | 6/2012 | Kim et al. |
| 2012/0245999 | A1 | 9/2012 | Hennessy |
| 2013/0187755 | A1 | 7/2013 | Rogers et al. |
| 2015/0229906 | A1 | 8/2015 | Inacio et al. |
| 2015/0310601 | A1 | 10/2015 | Rodriguez et al. |
| 2016/0300455 | A1 | 10/2016 | Hutchings et al. |
| 2017/0219354 | A1 | 8/2017 | Vasgaard et al. |

OTHER PUBLICATIONS

"Shopping cart tracking", IdenTrace Beyond Surveillance, identrace.com, Jul. 14, 2009, 2 pgs.

Rai, "Video analytics solution for tracking customer locations in retail shopping malls", Proceedings of the 17th ACM SIGKDD international conference on Knowledge discovery and data mining. ACM, 2011, 5 pgs.

* cited by examiner

SYSTEMS AND METHODS OF DETERMINING A LOCATION OF A MOBILE CONTAINER

RELATED APPLICATION

This application claims the benefit of and priority to U.S. Provisional Application No. 62/590,133 titled "Container Location Determination Methodology," filed on Nov. 22, 2017, the entirety of which provisional application is incorporated by reference herein for all purposes.

FIELD OF THE INVENTION

The invention relates generally to mobile item-collection containers. More particularly, the invention relates to such mobile containers having an integrated machine-vision system for determining the location of the containers within an indoor environment.

BACKGROUND

Understanding how shoppers navigate stores and make purchasing decisions can provide a wealth of information to various businesses. Such information includes which aisles the shoppers visit, and the amount of time spent in those aisles. Current state-of-the-art technology, such as GPS (Global Positioning System) can track the movement of shoppers through a store and generate tracking data but tend to be imprecise when pinpointing location. Other machine-vision technologies rely on optically read barcodes or special tags to identify locations within a facility, but such methods require modification to the facility to install these coded items.

SUMMARY

All examples and features mentioned below can be combined in any technically feasible way.

In one aspect, the invention relates to a system for locating a mobile container within a facility comprising an optical sensor system having at least one optical sensor fixed to a frame of the container. Each optical sensor is pointed away from the container in a direction facing a region of the facility where one or more distinctive physical features are expected to be found. Each distinctive physical feature of the facility is associated with a location in the facility. The at least one optical sensor is adapted to capture an image of that region of the facility. The system also comprises a computing system in communication with the at least one optical sensor fixed to the frame of the container. The computing system includes a processor configured to receive the image from the at least one optical sensor, to determine that a physical feature found in the image matches one of the distinctive physical features of the facility, and to identify the container as being at the location in the facility associated with the matching distinctive physical feature.

In one embodiment, the optical sensor system includes an infrared projector for projecting a distinct pattern used by the computing system to calculate depth. The infrared projector may be a camera separate from the at least one optical sensor or part of one optical sensor of the at least one optical sensor.

The computing system may be disposed remotely from the container and is configured to communicate wirelessly with the one or more optical sensors to the receive the image.

In some embodiments, one of the at least one optical sensor faces upwards towards a ceiling of the facility, downwards towards a floor of the facility, horizontally, parallel to a floor of the facility, or any combination thereof.

One or more distinctive physical features may include ductwork at a ceiling of the facility. The system may further comprise a database storing images of the one or more distinctive physical features of the facility and associating each stored image with a location in the facility. The processor of the computing system may be configured to match the physical feature in the captured image with a distinctive physical feature in a given image stored in the database and to identify a location of the container as the location associated with the given image in response to the match.

In one embodiment, the system may further comprise a radio-frequency receiver disposed on the container. The RF receiver receives a radio signal at a given radio frequency and the processor of the computing system is configured to determine a location of the container based on a relative strength of the given frequency of the received radio signal.

In another aspect, the invention relates to a method for locating a mobile container within a facility comprising the steps of associating a distinctive physical feature of the facility with a location in the facility; acquiring, by an optical sensor fixed to a frame of the mobile container, an image of a region of the facility; detecting a physical feature in the acquired image; matching the physical feature detected in the acquired image with the distinctive physical feature of the facility; and identifying the container as being at the location in the facility associated with the distinctive physical feature in response to matching the physical feature detected in the acquired image with the distinctive physical feature of the facility.

The region of the facility in the acquired image may be of a ceiling of the facility, of a floor of the facility, of a region of the facility horizontally parallel to a floor of the facility. The acquired image may be of a ceiling of the facility and a second acquired image may be of a floor of the facility.

The method may further comprise storing images of distinctive physical features in the region of the facility in a database and associating each stored image with a location in the facility. The method may further comprise matching the physical feature detected in the acquired image with a distinctive physical feature in a given image stored in the database and identifying a location of the container as the location associated with the given image in response to the match.

The method may further comprise receiving by a receiver, disposed on a frame of the mobile container, a radio signal having a given radio frequency and determining a location of the mobile container based on a relative strength of the given frequency of the received radio signal.

In another aspect, the invention is related to a system for locating a cart within a facility comprising an inertial measurement unit (IMU) fixed to the cart. The IMU is adapted to sense direction and speed as the cart moves and to report information related to the sensed direction and speed. The system further comprises a computing system in communication with the IMU. The computing system includes a processor configured to receive the information related to the direction and speed sensed and transmitted by the IMU and to determine a present location of the cart within the facility based on the information received from the IMU.

The system may further comprise a database that stores a map of the facility. The processor of the computing system is configured to overlay on the map an initialized location of the IMU and movement of the IMU based on the sensed direction and speed to determine the present location of the cart within the facility. The database may store loci of transmitted signals, which over time reveal individual and aggregate traffic patterns.

In another aspect, the invention relates to a system for locating a mobile container within a facility comprising an optical sensor fixed to a frame of the container. The optical sensor is pointed away from the container in a direction facing a region of the facility where one or more distinctive physical features of the facility are expected to be found. The optical sensor is adapted to capture an image of that region of the facility. A computing system, in communication with the optical sensor, includes a processor configured to receive the captured image from the optical sensor, to identify a distinctive physical feature of the facility in the captured image received from the optical sensor, and to determine a location of the container based on the identified distinctive physical feature. The system may further comprise a database that stores images of the one or more distinctive physical features of the facility and associates each stored image with a location in the facility. The processor of the computing system is configured to match the distinctive physical feature found in the captured image with a distinctive physical feature in a given image stored in the database and to identify a location of the container as the location associated with the given image.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Container-locating systems described herein allow the locating and tracking of a shopping basket, cart, or other container, automatically, and with high confidence, throughout a store, warehouse, or other indoor environment. These locating systems are especially useful in commercial inventory and retail shopping environments, providing convenient and unobtrusive ways to track goods, workers, and shoppers as they move about a facility.

For shoppers in a retail environment, as an example, such locating systems can improve the shopper's experience, for instance, by assisting the shopper in locating items on a shopping list and identifying an efficient route to picking the items on the shopping list. Additionally, such locating systems can offer promotions or guide customers to locate difficult-to-find items, bathrooms, or exits. As another example, in a warehouse environment, such locating systems can help managers monitor employee activity; and the locating systems can help employees engaged in a picking operation identify the location of an item and show an efficient pathway to pick items as they traverse through the warehouse or inventory room.

Further, such locating systems can collect and present a wealth of information to the management of a facility, for example, the traffic patterns of containers and, by implication, the people associated with each container. Management can then use this information for a variety of purposes, for example, to improve traffic flow at peak congestion times or to rearrange the goods in the facility for increased visibility.

Figure 1:
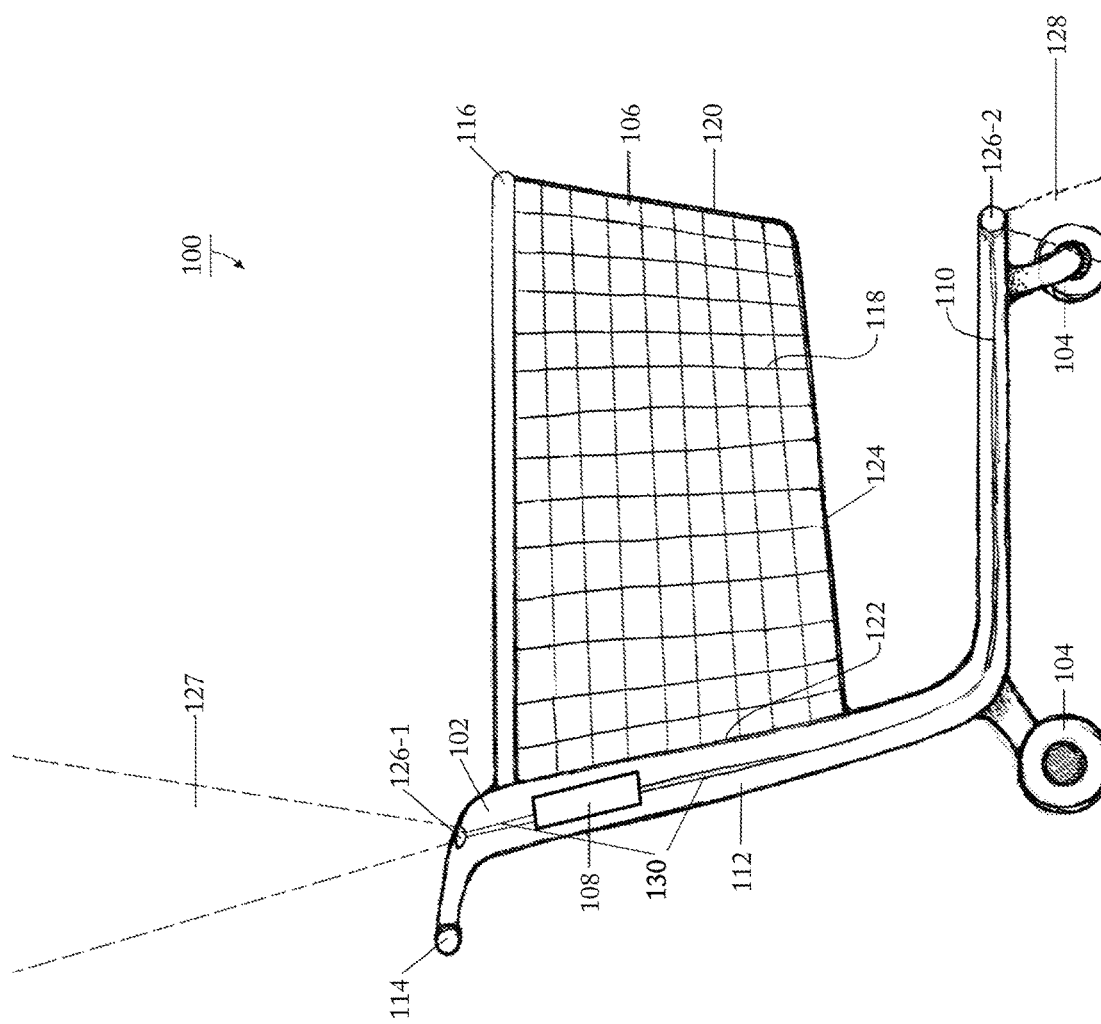
FIG. 1 is a side view of an embodiment of a cart with an integrated machine-vision system.
Figure 2:
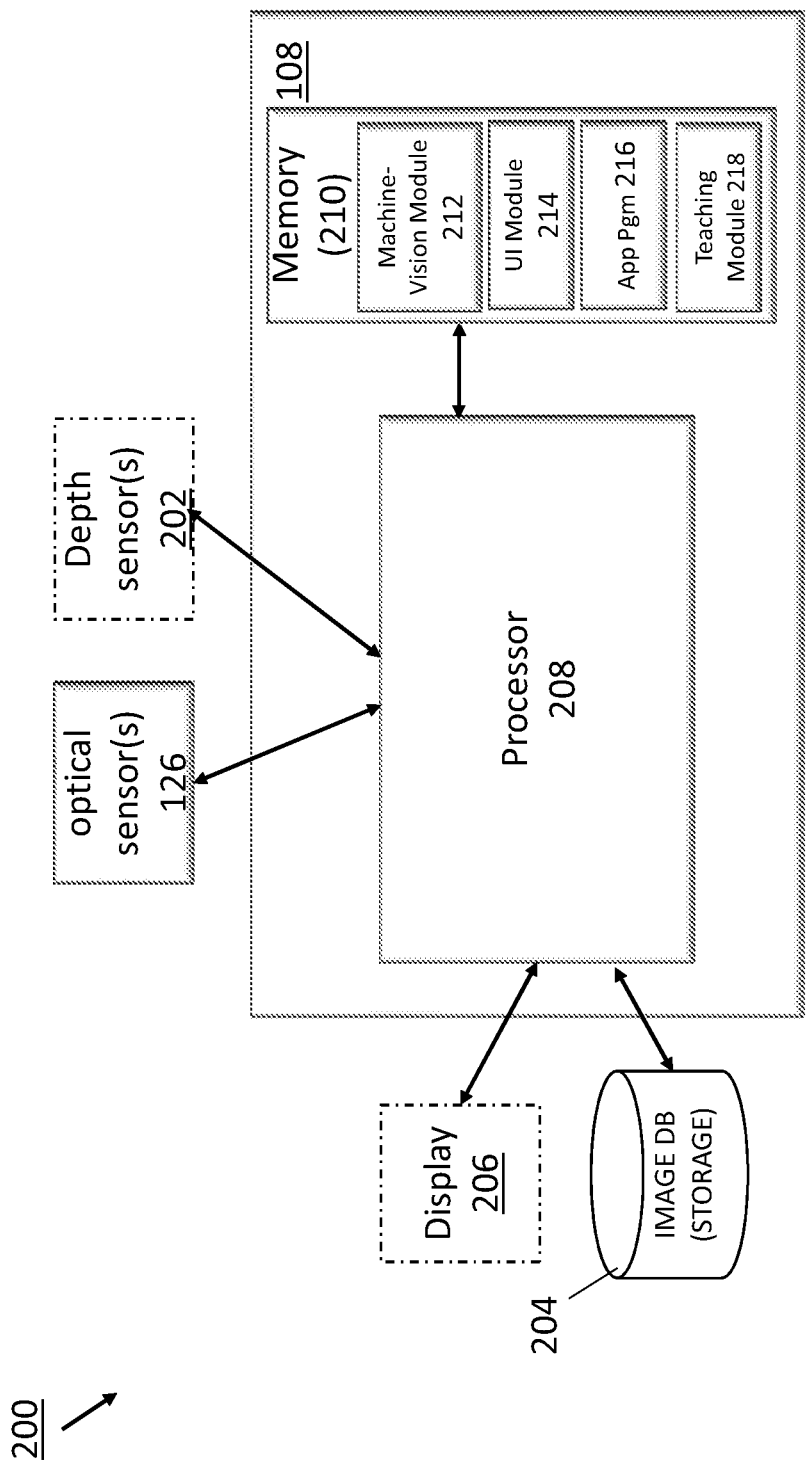
FIG. 2 is a block diagram of an embodiment of the machine-vision system.

FIG. 1 shows a side view of an embodiment of a shopping cart 100 having a frame 102 on wheels 104, a basket 106 coupled to the frame 102, and a machine-vision system 200 (FIG. 2). The construction of the shopping cart may be made of metal, plastic, or a combination thereof and/or of other materials, for example wood. The principles described herein extend to other examples of carts, which include, but are not limited to, carriages, carriers, trolleys, buggies, picker cart, grocery carts, and supermarket carts.

The frame 102 of this embodiment of shopping cart 100 has horizontal base rails 110 (one visible) and uprights 112 (one visible). The base rails 110 are located just above the wheels 104. Extending rearward from a back cross rail (not shown) is a handle 114 by which a person can grasp and move the shopping cart 100.

The wheels 104 of the shopping cart can be caster wheels, of the swivel or rigid variety. For example, the front two wheels can be swivel, while the rear two wheels are rigid. Alternatively, all four wheels can be rigid, or all four wheels can be swivel. The shopping cart 100 can have four wheels, one wheel at each corner of the cart, or, in other embodiments, three wheels, one in front center and two in the back. The basket 106 is, in this embodiment, a lattice, having a top edge 116, opposing side walls 118, a front wall 120, a back wall 122, and a bottom tray 124. The basket may also be referred to as a bin, container, or holder. The top edge 116 of the basket may be considered part of the frame 102 of the cart.

Components of the machine-vision system 200 include a computing system 108 in communication with at least one optical sensor 126 (i.e., a camera). Each optical sensor 126 can be an BW or RGB image camera or video camera, and can include depth sensing capability, embodied within a single camera, such as, for example, Microsoft's Kinect™, or embodied in separate devices, for instance, an optical sensor system comprising a camera and a separate infrared projector.

In the embodiment shown, the cart 100 has two optical sensors 126-1, 126-2 (generally, 126), both fixed within the frame 102 of the cart. Optical sensor 126-1 is disposed at a top end of the upright 112 and has a field of view 127 that points upwards towards the ceiling of the facility. Optical sensor 126-2 is disposed at one end of the horizontal base rail 110 and has a field of view 128 that points downwards towards the floor of the facility. The locations of the optical sensors 126 are illustrative examples; the locations of optical sensors 126 can be anywhere on the frame or basket (e.g., top edge 116) capable of supporting the attachment of a camera, provided such optical sensors 126 are positioned to take images of the ceiling and/or floor of the facility.

Embodiments of the cart 100 can have one or more ceiling-facing cameras (without any floor-facing cameras), one or more floor-facing cameras (without any ceiling-facing cameras), or a combination of ceiling-facing and floor-facing cameras. Embodiments of the cart 100 can also have optical sensors aimed horizontally, parallel to the surface of the floor, that captures image or video data in front of, behind, and/or to the sides of the cart. Such optical sensors can capture images of shelves or other physical features at "eye level" to that optical sensor.

The computing system 108 is also embodied within the frame 102 (FIG. 1 is a cutaway view that passes through the upright 112 and the base rail 110 to show the sensors 126 and computing system 108 housed within the frame). Wires 130 connect the optical sensors 126 to the computing system 108 and transmit image or video data captured by the optical sensors to the computing system.

The location of the computing system 108 on the cart, with the wired connections to the optical sensors 126, is an illustrative example; in another embodiment, the computing system can reside remotely, and the optical sensors 126 can communicate with the computing system wirelessly (e.g., BLUETOOTH®, Wi-Fi, radio signals). In one embodiment, the computing system 108 can be in communication with a display screen (not shown) mounted to the frame 102, basket 106, or handle 114 of the cart 100 wherever the display screen can facilitate user interaction and ease of use. The computing system 108 can present on the display screen a user interface screen that permits interaction with the employee or shopper.

In an embodiment of the cart, the computing system 108 on the cart includes an inertial measurement unit (IMU) device (not shown). The IMU device senses direction and acceleration of the cart and transmits information (data) related to the sensed direction and acceleration. An example embodiment of the IMU device is the MPU-6050 manufactured by InvenSense of San Jose, Calif. From the information produced by the IMU device, the computing system can calculate the current location of the chip. By recording the accumulation of loci, the computing device can calculate the path of the cart taken through the facility. The computing system can trigger the IMU device to start (or restart) at a specific point (e.g., at the store entrance) to establish the reference location to which the calculations are applied. Other triggers to initialize the IMU device include, but are not limited to, a manual restart and detecting that the cart is at a specific location within the facility (e.g., the store entrance). The calculated movement of the cart can be overlaid with a map of the facility, to provide not only information about the path of movement of the cart through the facility, but also about how long the cart sits motionless at times in the store (e.g., how long a shopper paused before the shampoo display). Embodiments of the cart with the IMU chip can also include a machine-vision system, such as that described herein, by which the computing system can establish the reference (and/or subsequent) location of the cart. The results derived from the IMU can be used to confirm those of the machine-vision system, or the results of the machine-vision system to confirm those of the IMU.

In brief overview, during operation of the container-locating system 100, the computing system 108 receives an image from one or more of the optical sensors 126, identifies physical feature(s) in the image, determines that a physical feature found in the image corresponds to a distinctive physical feature known to be at a given location in the facility (e.g., by comparing the features identified in the image with an existing database of images of features in on the floor or on the ceiling in the facility), and, because of that determination, identifies the cart as being at that given location. The operation of the container-locating system 100 involves feature detection in the cart-captured images and feature matching with images in a library (i.e., matching appearances), not reading and decoding position-identifying patterns or codes placed on the ceiling or the floor.

In one embodiment, described in detail in connection with FIG. 4, the cart 100 includes a radio-frequency (RF) receiver (not shown). A plurality of RF tags or beacons are placed around a facility, for example, on store shelves. Each RF tag or beacon transmits an RF signal at a frequency unique to that RF tag or beacon. The RF receiver on the cart receives the RF signal. Software executing on the computing system 108 (local to the cart) searches for a match to the unique frequency of the received radio signal in a database that associates unique signal frequencies to RF tags or beacons and such RF tags or beacons to locations in the facility. By a match, the system has identified the location of the RF transmitter and, in combination with an analysis of transmitted signal strength, hence, the location of the cart. This location of the cart, determined by this received RF signal, can be used to confirm the location determination made by the computing system based on an image captured by an optical sensor on the cart. If there are numerous RF tags or beacons in a location, the software executing on the computing system 108 calculates the relative strength of each signal and from that strength data, determines the location of the receiver, and, therefore, the location of the cart with the receiver.

FIG. 2 shows an embodiment of the machine-vision system 200 including the computing system 108, one or more optical sensors 126, optionally one or more infrared pattern depth sensors 202, an image database 204, and an optional display screen 206. Instead of depth sensors, depth sensing (i.e., distance calculations) can be obtained by comparing the differences between images obtained by a plurality of optical sensors. For instance, knowing the position of a camera and a light source, the computing system can determine by shadow size, direction, and length, how far away a distinctive feature is. Comparing images from two separate cameras (or imaging points) can provide this distance information, too.

The computing system 108 includes a processor 208 in communication with memory 210, each optical sensor 126, each optional depth sensor 202, the image database 204, and the optional display screen 206. Stored in the memory 210 is software, including a machine-vision module 212, which, when executed by the processor 208, performs the image-processing, feature matching, and cart locating operations described in more detail in connection with FIG. 3. Software also stored in the memory 210 is a user interface module 214, which, when executed by the processor 208, produces a user interface on the display screen 206. This user interface may function as an entertainment portal, an internet connection, an emergency-information transmitter, or other screen-based computer functions.

The software stored in the memory 210 can also include an application program 216 that communicates with a corresponding application program executing on a mobile device (e.g., smartphone) of the shopper, for example, by electronic mail, near-field communications (NFC) or BLUETOOTH®, to acquire, for example, the user's shopping list, or, in warehouse applications, a picker's list. The computing system can display this list on the user interface produced on the display screen 206. Alternatively, if there's a display screen 206 with an interactive user interface, the shopper can enter the shopping list of desired items manually (e.g., at the start of their shopping trip). In another example, which involves the Internet Things (IoT), the shopper can create the shopping list at home (or other site other than the shopping facility) and email the list or otherwise electronically transmit the list to the facility or an intermediate service, such as a smartphone app.

The image database 204 contains a library of images taken of regions of the ceiling and/or of the floor of the facility. Each stored image includes one or more clearly visible, distinctive physical features of the photographed region. A physical feature is considered distinctive if it's appearance (and immediate surroundings) can be unambiguously tied to a specific location within the facility and to no other location. Such distinctive features may be three-dimensional or two-dimensional in shape; some such features are integral or built-in physical features of the structure or construction of the facility; other distinctive features are intentional and unintentional modifications to the ceiling and/or floor. Examples of distinctive features of a ceiling include, but are not limited to, heating, venting, and air conditioning ductwork, pipework, plumbing, wiring, fuse boxes, lights, skylights, sprinkler systems, and support structures, such as trusses, a broken light, a missing ceiling tile. Examples of distinctive physical features of a floor include, but are not limited to, floor coverings and patterns contained therein, transitions in floor coverings, door jambs, and other surface characterizations, such as bathroom tile, indicating a bathroom location, or dents, scratches, visible wear on a carpet, rubber tracks on a concrete floor, and other unique marks that uniquely signify a physical location within a facility. Each distinctive feature in a stored image may be catalogued (i.e., identified and named) within the database 204 and associated with that image to facilitate feature matching.

Each image stored in the image database 204 is also cross-referenced or associated with the location in the facility of the photographed region. For example, an image stored in the image library of a broken light known to be at the intersection of row A with aisle 3 is associated in the image database 204 with that location. An image captured by an optical sensor of a broken light that matches the stored image of the broken light thus identifies the location of the cart as the intersection of row A with aisle 3, namely, the location associated with that stored image.

One embodiment of a cart 100 has optical sensors aimed horizontally, parallel to the surface of the floor. To accommodate such carts, the image database 204 can further include images of distinctive physical features expected to be in the field of view of these cameras, for example, shelves, wall sockets, displays, and checkout counters, for matching with captured images. Because personnel and shoppers often add and remove merchandise from shelves, and personnel can rearrange shelves, images captured by these horizontally aimed optical sensors may not be reliably matched with images in the image database. Instead of relying wholly these optical sensors for locating the cart, the locating-system can supplement the results obtained from those optical sensors pointing to the ceiling and/or the floor. A cart location derived from a horizontally aimed optical sensor can be used to double check a cart location derived from a vertically aimed optical sensor (i.e., one facing up or down).

Embodiments of the cart 100 that have a ceiling-facing camera and a floor-facing camera may conceivably have one of the cameras capture an image of a distinctive feature while the other camera does not. When both types of cameras capture an image of a distinctive feature (one on the floor, the other at the ceiling), the computing system can use the location determined from the one camera to confirm the location determination of the other.

To populate the image database 204 with the images of pertinent regions of the facility, feature identification, and associated location information, the processor 208 executes a teaching module 218. Through this teaching module 218, the processor 208 "trains" or "teaches" the database 204 with images of distinctive physical features on the ceiling and/or floor (and/or, optionally, e.g., shelves) taken by personnel. The teaching module 218 can stitch the images together to produce a map of either or both the ceiling and the floor, with the identified (known) locations of each distinctive feature in the map(s). The map of stitched-together images serves as an illustrative example by which the database associates stored images with facility locations. Accordingly, a map of the ceiling of the store can show, for example, every section of duct work and every lighting fixture. By comparing an acquired image of a broken light against the stored map of the ceiling, the system finds the part of the map with the matching image and identifies the location of the cart based on the location of the matching image in the map.

Although the processor 208 is described herein as executing all the software stored in memory 210, it is to be understood that different processors of different computing systems can execute different ones of the software modules or application programs.

Figure 3:
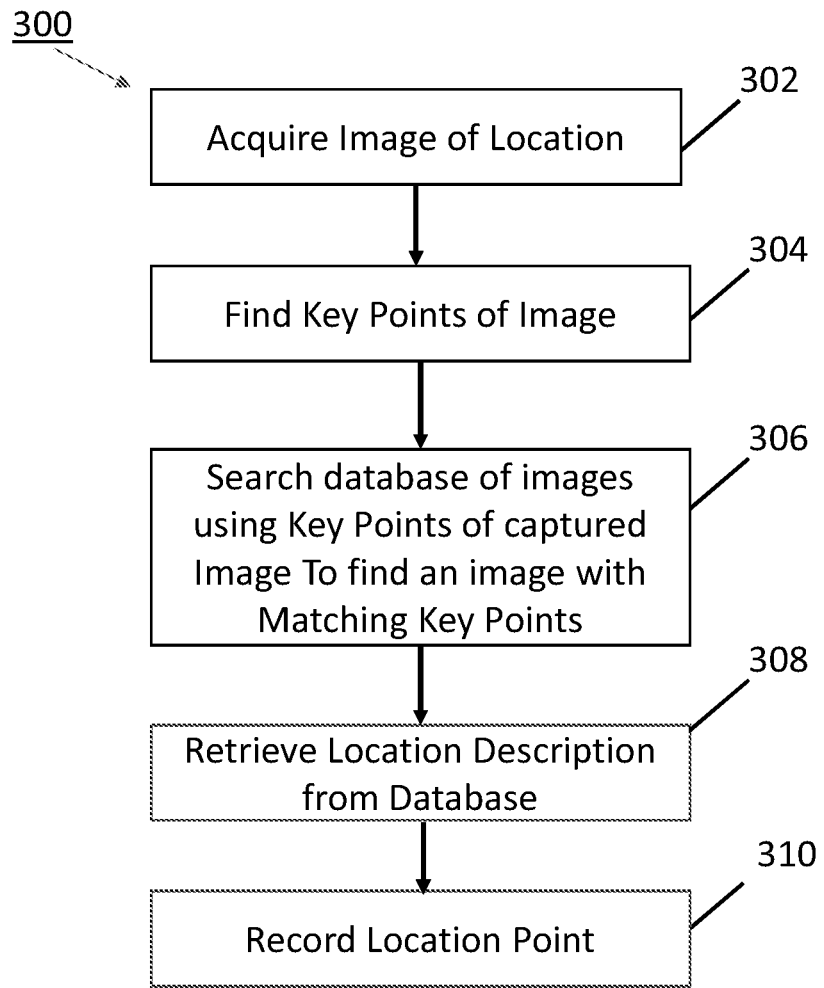
FIG. 3 is a flow diagram of an embodiment of a process for determining the location of a cart, having an integrated machine-vision system, within an indoor environment.

FIG. 3 shows an embodiment of an automated process 300 for determining the real-time location of the cart within a facility. At step 302, an optical sensor captures an image of the ceiling (or floor) at a location within the facility and transmits the image to the computing system. The image captured by the optical sensor has the resolution necessary to allow the effective extraction of details for purposes of recognizing a distinctive physical feature, for example, the size and type of duct work. The computing system executes the machine-vision module 212 to perform image processing techniques that optionally preprocess the image, analyze the image, and attempt to detect distinctive features in it. For example, from an image or series of images acquired by a camera on the cart, the processor can derive the distance of a physical feature from the camera. The processor can also determine the perspective and curvature from depth information acquired, provided the camera that acquired the image has depth sensing capabilities. The processor can use the distance and perspective to scale and shear the captured image for purposes of matching the image resolution of those images stored in the image library.

The image processing of the captured (and, optionally, preprocessed) image finds (step 304) key points in the image. Detected key points for purposes of image matching can include size and color distribution in addition to salient visual descriptors. For example, the detected key points can be the four corners of an air vent in the ceiling. Standard image matching techniques, such as SURF (Speeded Up Robust Features) and SIFT (Scale Invariant Feature Transform), can be used to find such key points. The computing system uses these detected key points to search (step 306) the image database 204 for an image with matching distinctive features. In response to finding a matching image, the computing system acquires, from the image database 204, the location in the facility associated with the matched image. This location corresponds to the location where the optical sensor captured the image of, for example, the air vent in the ceiling. The computing system records (step 310) this location as the present (i.e., last known) location of the cart.

The computing system can display the determined present location of the cart in the user interface (along with any other information the facility may choose) on the display screen 206 (FIG. 2). Through this user interface screen, the computing system can direct employees or shoppers from the present location of the cart toward the locations of items for which they are searching. The computing system may advertise alternative items or promotions to the user through the user interface screen.

Other actions that can be performed after the distinctive features (i.e., key points) in a captured image are matched to the distinctive features of an image stored in the image library 204 include, but are not limited to, determining a path through the facility from successive matched location points and associating time stamps with each location point along on path to track the history of the movement of the container through the facility, comparing the present location of the container with previously recorded paths taken through the facility and anticipating a future path.

Figure 4:
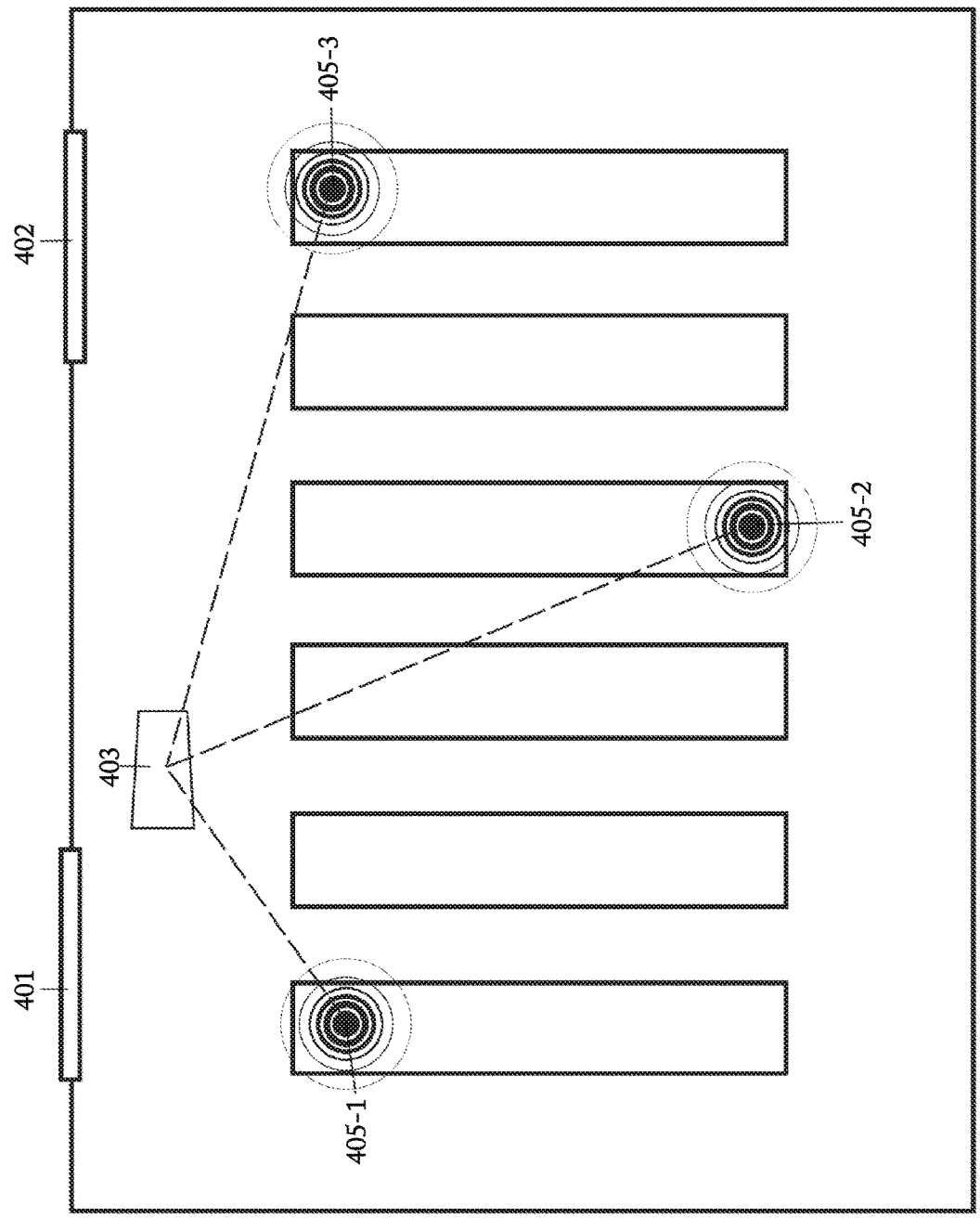
FIG. 4 is a diagram of an embodiment of system for determining the location of a mobile container using radio-frequency technology.

FIG. 4 shows an example of determining the location of a cart 403 using radio-frequency technology. The description of this example is oversimplified to demonstrate more clearly the principles of this manner of location determination. Three radio-frequency beacons 405 are placed within a facility. In this example, the cart 403 has a computing device (not shown) in which a radio receiver is embedded. Because radio signals decrease in strength over distance, the distance from each RF-transmitting beacon can be determined by signal strength. Comparing the relative strength of the beacons allows the computing device to determine cart location. In this example, the cart 403 is located near the entrance 401 of the store and receives signals from the beacons 405-1, 405-2, and 405-3. The strength of the beacon 405-1 at the end of the first aisle is the strongest signal. The signals from the beacon 405-2 at the far end of the fourth aisle and the signal from the beacon 405-3 at the front end of the last aisle are similar in strength because they are approximately equidistant from the cart. Thus, the computing device can determine the cart is in the front of the store, closer to the entrance 401 than the exit 402.

As will be appreciated by one skilled in the art, aspects of the present invention may be embodied as a system, method, and computer program product. Thus, some aspects of the present invention may be embodied entirely in hardware, entirely in software (including, but not limited to, firmware, program code, resident software, microcode), or in a combination of hardware and software.

In addition, aspects of the present invention may be in the form of a computer program product embodied in one or more computer readable media having computer readable program code stored thereon. Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include Python, C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's device, such as the mobile device 140, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet, using an Internet Service Provider).

Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles of this invention. In these instances, the systems and methods of this invention may be implemented as program embedded on personal computer such as JAVA® or CGI script, as a resource residing on a server or graphics workstation, as a plug-in, or the like. The system may also be implemented by physically incorporating the system and method into a software and/or hardware system.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. References to "one embodiment" or "an embodiment" or "another embodiment" means that a feature, structure or characteristic described in connection with the embodiment is included in at least one embodiment described herein. References to one embodiment within the specification do not necessarily all refer to the same embodiment. The features illustrated or described in connection with one exemplary embodiment may be combined with the features of other embodiments.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all the described terms. Any references to front and back, left and right, top and bottom, upper and lower, and vertical and horizontal are intended for convenience of description, not to limit the present systems and methods or their components to any one positional or spatial orientation. Accordingly, the foregoing description and drawings are by way of example only, and the scope of the invention should be determined from proper construction of the appended claims, and their equivalents.

What is claimed is:

1. A system for locating a mobile container within a facility comprising:
    an optical sensor system having at least one optical sensor fixed to a frame of the container, each optical sensor being pointed away from the container in a direction facing a region of the facility where one or more distinctive physical features are expected to be found, each distinctive physical feature of the facility being associated with a location in the facility, the at least one optical sensor being adapted to capture an image of that region of the facility wherein one of the at least one optical sensor faces downwards towards a floor of the facility; and
    a computing system in communication with the at least one optical sensor fixed to the frame of the container, the computing system including a processor configured to receive the image from the at least one optical sensor, to determine that a physical feature found in the image matches one of the distinctive physical features of the facility, and to identify the container as being at the location in the facility associated with the matching distinctive physical feature.

2. The system of claim 1, wherein the optical sensor system includes an infrared projector for projecting a distinct pattern used by the computing system to calculate depth.

3. The system of claim 2, wherein the infrared projector is a camera separate from the at least one optical sensor.

4. The system of claim 1, wherein the computing system is disposed remotely from the container and is configured to communicate wirelessly with the at least one optical sensor to the receive the image.

5. The system of claim 1, wherein another of the at least one optical sensor faces upwards towards a ceiling of the facility.

6. The system of claim 1, further comprising a database storing images of the one or more distinctive physical features of the facility and associating each stored image with a location in the facility.

7. The system of claim 6, wherein the processor of the computing system is configured to match the physical feature in the captured image with a distinctive physical feature in a given image stored in the database and to identify a location of the container as the location associated with the given image in response to the match.

8. The system of claim 1, further comprising a radio-frequency receiver disposed on the container, the RF receiver receiving a radio signal at a given radio frequency, and wherein the processor of the computing system is configured to determine a location of the container based on a relative strength of the given frequency of the received radio signal.

9. A method for locating a mobile container within a facility comprising:
    associating a distinctive physical feature of the facility with a location in the facility;
    acquiring, by an optical sensor fixed to a frame of the mobile container, an image of a region of the facility, wherein the region of the facility in the acquired image is a floor of the facility;
    detecting a physical feature in the acquired image;
    matching the physical feature detected in the acquired image with the distinctive physical feature of the facility; and
    identifying the container as being at the location in the facility associated with the distinctive physical feature in response to matching the physical feature detected in the acquired image with the distinctive physical feature of the facility.

10. The method of claim 9, further comprising acquiring, by another optical sensor fixed to the frame of the container, an image of a ceiling of the facility.

11. The method of claim 9, further comprising acquiring an image by another optical sensor fixed to the frame of the container facing horizontally parallel to the floor of the facility.

12. The method of claim 9, further comprising:
storing images of distinctive physical features in the region of the facility in a database; and
associating each stored image with a location in the facility.

13. The method of claim 12, further comprising:
matching the physical feature detected in the acquired image with a distinctive physical feature in a given image stored in the database; and
identifying a location of the container as the location associated with the given image in response to the match.

14. The method of claim 9, further comprising:
receiving, by a receiver disposed on the frame of the mobile container, a radio signal having a given radio frequency; and
determining a location of the mobile container based on a relative strength of the given frequency of the received radio signal.

\* \* \* \* \*